(12) United States Patent
Arunachalam et al.

(10) Patent No.: US 7,701,862 B2
(45) Date of Patent: Apr. 20, 2010

(54) METHOD AND SYSTEM FOR PHY LOOP DETECTION

(75) Inventors: Saravan Arunachalam, Sunnyvale, CA (US); Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 996 days.

(21) Appl. No.: 11/287,047

(22) Filed: Nov. 25, 2005

(65) Prior Publication Data

US 2007/0121518 A1 May 31, 2007

(51) Int. Cl.
*H04L 12/26* (2006.01)
*H04L 12/66* (2006.01)
*H04L 5/16* (2006.01)
*H04B 1/44* (2006.01)

(52) U.S. Cl. .................. 370/249; 370/282; 370/463; 375/221

(58) Field of Classification Search ......... 370/241–252, 370/282; 375/221, 240.05, 240.07
See application file for complete search history.

(56) References Cited

U.S. PATENT DOCUMENTS

| | | | |
|---|---|---|---|
| 6,215,816 B1 * | 4/2001 | Gillespie et al. ............ 375/219 |
| 6,826,156 B1 | 11/2004 | Sutton et al. | |
| 6,992,989 B2 * | 1/2006 | Chen et al. .................. 370/282 |
| 7,068,609 B2 * | 6/2006 | Huff ............................ 370/252 |
| 7,124,330 B2 * | 10/2006 | Wong et al. .................... 714/43 |
| 7,339,902 B2 * | 3/2008 | Tung et al. ................... 370/279 |
| 7,477,611 B2 * | 1/2009 | Huff ............................ 370/252 |
| 2002/0041571 A1 * | 4/2002 | Huff ............................ 370/252 |
| 2003/0120820 A1 * | 6/2003 | Chen ........................... 709/250 |
| 2004/0013126 A1 * | 1/2004 | Yun ............................. 370/433 |
| 2004/0064275 A1 * | 4/2004 | Rakshani et al. .............. 702/60 |
| 2009/0175283 A1 * | 7/2009 | Jan et al. ...................... 370/401 |

OTHER PUBLICATIONS

Hernandez, Rich, "Gigabit Ethernet Auto-Negotiation", Dell Network Environment PowerSolutions, Jan. 2001, pp. 117-122.*
Taborek Rich, "Ethernet Auto-Negotiation Overview", Transoft Networks, T11/98-563v0, Nov. 1998, pp. 1-13.*

* cited by examiner

*Primary Examiner*—Tri H Phan
(74) *Attorney, Agent, or Firm*—Trellis IP Law Group, PC

(57) ABSTRACT

A method, system and apparatus are provided for detecting a loop-back in a physical layer on an Ethernet link. In the physical layer, a device sends a base page on the Ethernet link. The base page has at least one next page capability bit set. Subsequently, the device receives a received base page. Thereafter, for detecting the loop-back, the next page capability bit is set in the received base page is determined.

14 Claims, 8 Drawing Sheets

METHOD AND SYSTEM FOR PHY LOOP DETECTION

BACKGROUND OF THE INVENTION

1. Field of Invention

Embodiments of the invention relate in general to communication in Ethernet. More specifically, the embodiments of the invention relate to a method and a system for the detection of a loop in the physical layer of an Ethernet port.

2. Description of the Background Art

A seven-layer architecture, known as Open System Interconnect (OSI) model, is commonly used for communication in computer networks. The Ethernet is a Local Area Network (LAN) technology that defines wiring and signaling of the physical layer of the OSI model. The Ethernet also defines protocols for Media Access Control (MAC) or the data link layer of the OSI model, and the format for transmitting frames. The physical layer is also known as PHY or layer 1 and the data link layer is known as layer 2.

In the case of a fault, an incorrect configuration or a non-compliant installation, a signal or a data packet sent from a computer that is connected to a network may not reach the PHY of-a destination computer. Further, the sent data packet may incorrectly revert to the sending computer. Such a situation is referred to as a 'loop-back'. The reverting of data packets may overload the CPU of the sending computer, and also result in the loss of data. Further, the reverting may cause problems in the normal operation of other applications executing on the sending computer.

An existing method for detection of loop-back faults is known as a 'keep-alive mechanism'. The keep-alive mechanism transmits and receives special data. If the sending computer receives the transmitted special packet, a loop-back link fault is declared and transmission of data is stopped. However, the keep-alive mechanism requires layer 2 to transmit frames. Once layer 2 is in communication, other applications on a computer may also use it for transmitting and receiving data. A loop-back may cause problems in the functioning of the other applications. Moreover, the keep-alive mechanism requires a CPU to constantly generate frames to detect a loop-back, which results in the consumption of CPU resources.

DETAILED DESCRIPTION OF EMBODIMENTS OF THE INVENTION

The various embodiments of the invention provide a method, a system, and a computer-readable medium for detecting loop-back in a physical layer on an Ethernet link. The Ethernet link uses a process known as 'auto negotiation' to determine the capabilities of the PHY devices at either end of the Ethernet link. The PHY device in auto negotiation process sends data formatted as a "base page" and a "next page". The base page contains basic information necessary for operation of the Ethernet link and the next page contains information that may not be necessary for the operation of the link. The base page includes information regarding the type of Ethernet connection supported, next page capability and so forth. The next page includes a message page, format of message page and so forth. In an embodiment of the invention, a device sends a base page, followed by zero or more sent next pages on the physical layer of the Ethernet link. The device also receives a base page, followed by zero or more next pages. Thereafter, a loop-back is declared, if the sent next pages and the received next pages match.

Figure 1:
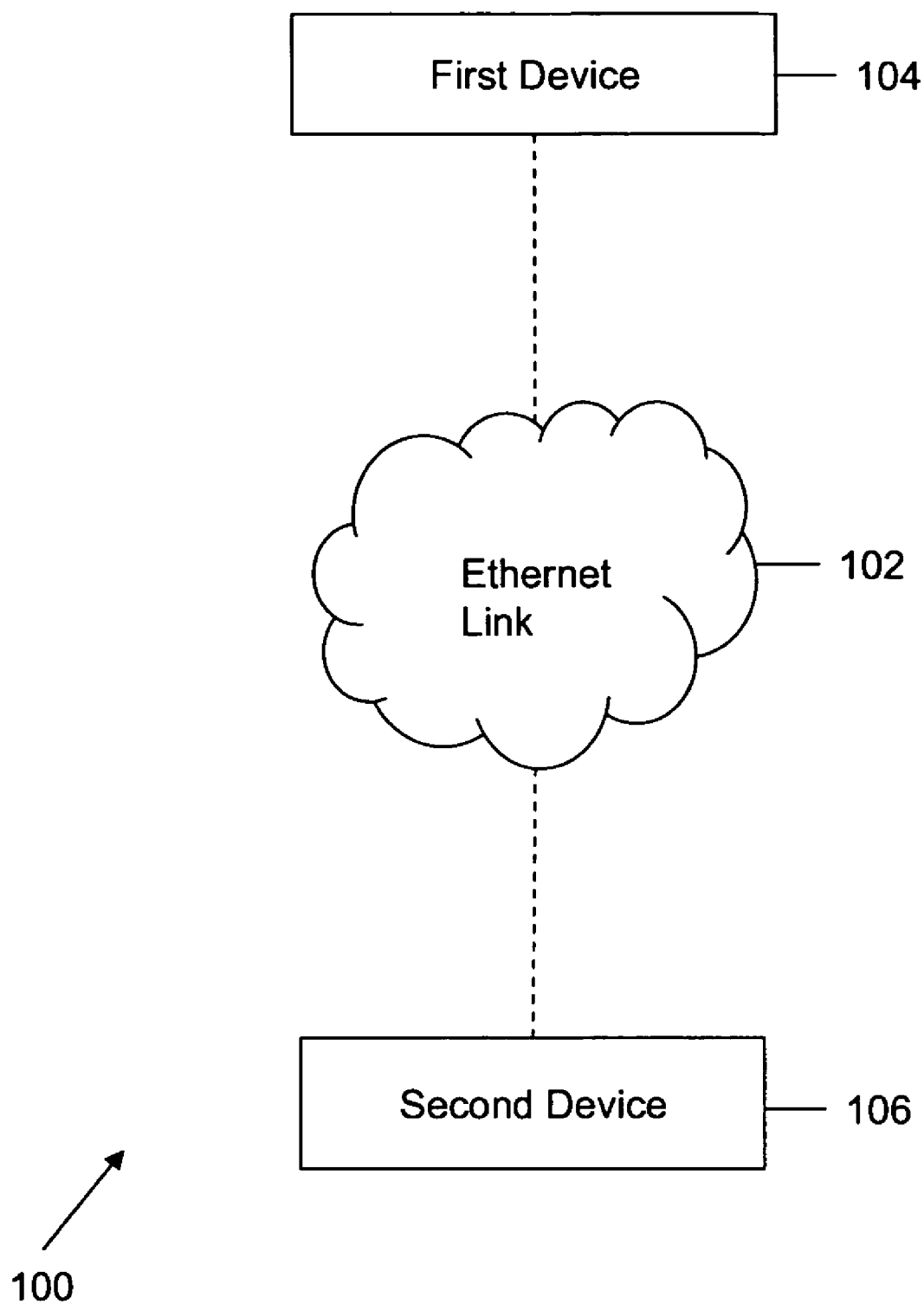
FIG. 1 illustrates an exemplary environment wherein the embodiments of the invention can be practiced.

FIG. 1 illustrates an exemplary environment 100 wherein the embodiment of the invention can be practiced. Environment 100 can contain a network link. According to the various embodiments of the invention, the network link can be an Ethernet link 102. Ethernet link 102 includes a first device 104 and a second device 106, in accordance with an exemplary embodiment of the present invention. In various embodiments of the invention, first device 104 and second device 106 can be a Data Terminal Equipment (DTE) or a processing device, for example, a personal computer, a general-purpose computer, a laptop, a palmtop, etc. In an embodiment of the invention, second device 106 is a link partner to first device 104.

In an embodiment of the invention, first device 104 communicates with second device 106 over Ethernet link 102. Ethernet link 102 can include networks such as Local Area Network (LAN), Wide Area Network (WAN), Metropolitan Area Network (MAN), Personal Area Network (PAN), Industrial Ethernet network, home network, and so forth.

First device 104 establishes a link with second device 106 to start communication. The link is established at the physical layer of first device 104 and second device 106. The physical layer is defined in a seven-layer architecture model, known as the Open System Interconnect (OSI) model. The OSI model is used for communication in computer networks. The physical layer is also known as PHY or layer 1.

In an embodiment of the invention, an auto-negotiation feature, described by Institute of Electrical & Electronic Engineers (IEEE) et al., i.e., IEEE 802.3-2004 Clause 28, is used to establish the link. Auto- negotiation uses a series of link pulses known as a Fast Link Pulses (FLP) burst to encode a 16-bit word. The FLP burst interweaves a clock pulse with a data pulse to encode a 16-bit word, known as a link code word. The link code word may be in the format known as a base page or may be an optional extension format known as a next page. In an embodiment of the invention, first device 104 exchanges base pages with second device 106, to establish the link. After the link is established, data transmission may be started by connecting the data link layer of first device 104 to the data link layer of second device 106. The data link layer is defined in the OSI model and is also known as layer 2.

In an embodiment of the invention, second device 106 can have functions that are identical to that of first device 104.

Figure 2:
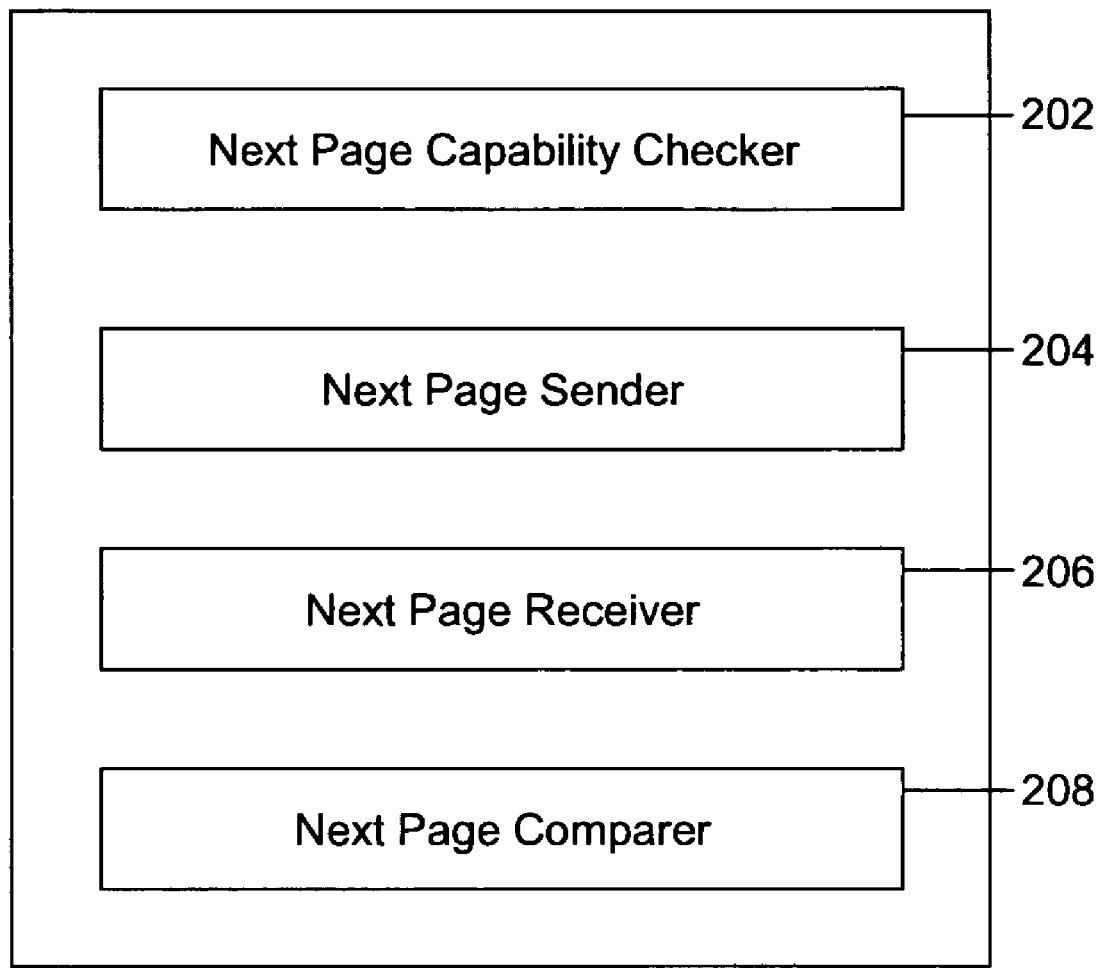
FIG. 2 is a block diagram of a system for detecting loop-back, in accordance with an exemplary embodiment of the present invention.

FIG. 2 is a block diagram of a system 200 for detecting loop-back, in accordance with an exemplary embodiment of the present invention. System 200 includes a next page capability checker 202, a next page sender 204, a next page receiver 206, and a next page comparer 208. In an embodiment of the invention, the elements of system 200 are located on first device 104. In another embodiment of the invention, the elements of system 200 are also located on second device 106.

In an embodiment of the invention, a base page includes the information pertaining to the capabilities of a device. The capabilities of the device include the mode of the Ethernet connection supported, such as 10Base-T, 10Base-T Full Duplex, 100Base-TX, 100Base-TX Full Duplex, 100Base-T4, and so forth. The capabilities also include other parameters such as the capability of a device to send and receive a next page. The next page is a medium for transmitting additional information beyond the information transmitted by the base pages. The additional information transmitted by the next page includes proprietary information relating to the device. Next page capability checker 202 checks the capability of second device 106 to send and receive next pages. In an embodiment of the invention, next page capability checker 202 sends and receives base pages to check the capability of second device 106 to send and receive next pages. In another embodiment of the invention, next page capability checker 202 compares the sent and received base pages to check the capability of second device 106 to send and receive next pages. In an embodiment of the invention, next page capability checker 202 declares a loop-back or a no loop-back condition based on the result of comparison of the sent and received base pages.

In an embodiment of the invention, next page capability checker 202 reads and updates an Auto-Negotiation Advertisement Register (ANAR) and an Auto-Negotiation Link Partner Advertisement Register (ANLPAR). The ANAR and ANLPAR registers are defined for the PHY of first device 104. The ANAR is used to set the capabilities of first device 104. The information in ANAR is sent in a sent base page. The ANLPAR includes information on the capabilities of second device 106. The ANLPAR is updated on the receipt of a received base page from second device 106. If the ANLPAR indicates that the second device is not capable of next page then next page capability checker 202 declares a no loop-back condition.

Next page sender 204 sends a sent next page from first device 104 to second device 106. In an embodiment of the invention, next page sender 204 sends the sent next page, based on the capability of second device 106 to send and receive next pages. In an embodiment of the invention, next page sender 204 reads an Auto-Negotiation Expansion Register (ANER) and an Auto-Negotiation Next Page Transmit Register (ANNPTR). In another embodiment of the invention, next page sender 204 updates the ANNPTR. The ANER and the ANNPTR are defined for the PHY of first device 104. The ANER includes information such as the next page capability of first device 104, the next page capability of second device 106, the auto-negotiation capability of second device 106, the receipt of a new page, a parallel detection fault, and so forth. The ANNPTR is used to set the information that is to be sent in the sent next page from first device 104. In another embodiment of the invention, next page sender 204 may send next pages with an NP bit set to 0.

Next page receiver 206 receives a received next page from second device 106. The received next page is received at first device 104. In an embodiment of the invention, next page receiver 206 reads the ANER and an Auto-Negotiation Link Partner Next Page Receive Register (ANLPNPRR). The ANLPNPRR is defined for the PHY of first device 104. The ANLPNPRR includes the information contained in the received next page. In another embodiment of the invention, next page receiver 206 may receive a next page from a far end device.

Next page comparer 208 compares the sent next page and the received next page. In an embodiment of the invention, next page comparer 208 reads and compares the information included in the ANNPTR and the ANLPNPRR. In an embodiment of the invention, next page comparer 208 declares loop-back, based on the results of the comparison. In another embodiment of the invention, next page comparer 208 also declares a no loop-back condition.

In an embodiment of the invention, next page sender 204, next page receiver 206, and next page comparer 208 function sequentially to send, receive and compare next pages. In another embodiment of the invention, one or more of next page sender 204, next page receiver 206, and next page comparer 208 may not be required to function to detect loop-back. For example, next page sender 204, next page receiver 206, and next page comparer 208 are not required if the second device is not capable of sending or receiving a next page.

In various embodiments of the invention, elements of system 200, such as next page sender 204, next page receiver 206, and next page comparer 208, is implemented in the form of software, hardware, firmware, or their combination thereof.

Figure 3:
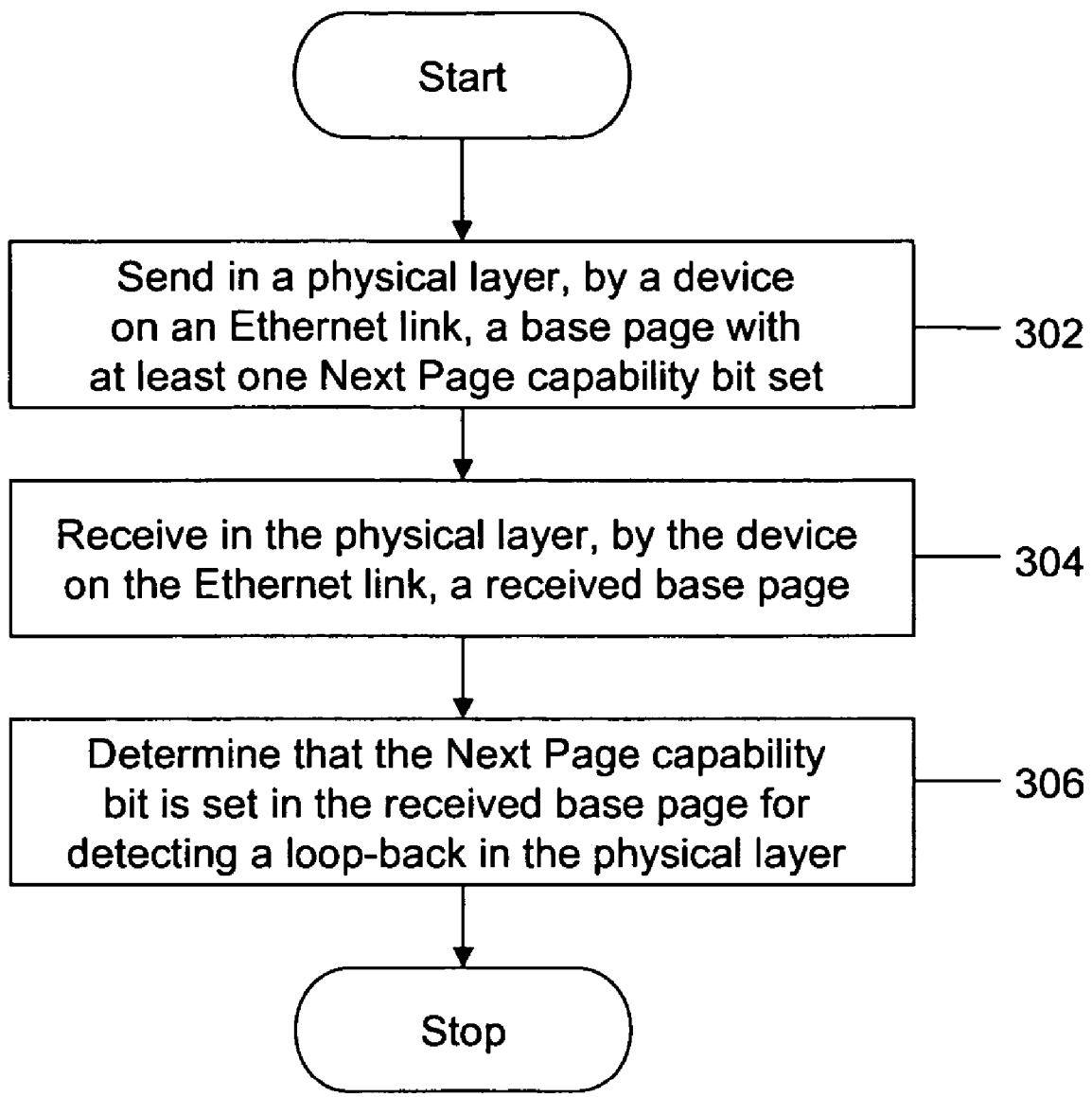
FIG. 3 is a flowchart depicting a method for detecting loop-back, in accordance with an exemplary embodiment of the present invention.

FIG. 3 is a flowchart depicting a method for detecting a loop-back, in accordance with an exemplary embodiment of the present invention. At step 302, a base page is sent from a device in the physical layer. In an embodiment of the invention, the base page is sent on an Ethernet link. The base page has next page capability bit set. Thereafter, at step 304, a base page is received by the device. In an embodiment, the received base page can be a base page transmitted by second device 106. At step 306, the next page capability bit is determined in the received base page to detect the loop-back in the physical layer. In an embodiment of the invention, the next page capability bit is examined in the received base page to detect the loop-back in the physical layer. In an embodiment of the invention, if the next page capability bit is not set in the received base page, then it is decided that no loop-back exists. In another embodiment of the invention, if the next page capability is set in the received base page, then next pages are sent to detect the loop-back. In an embodiment of the invention, the next pages are sent by first device 104.

Figure 4:
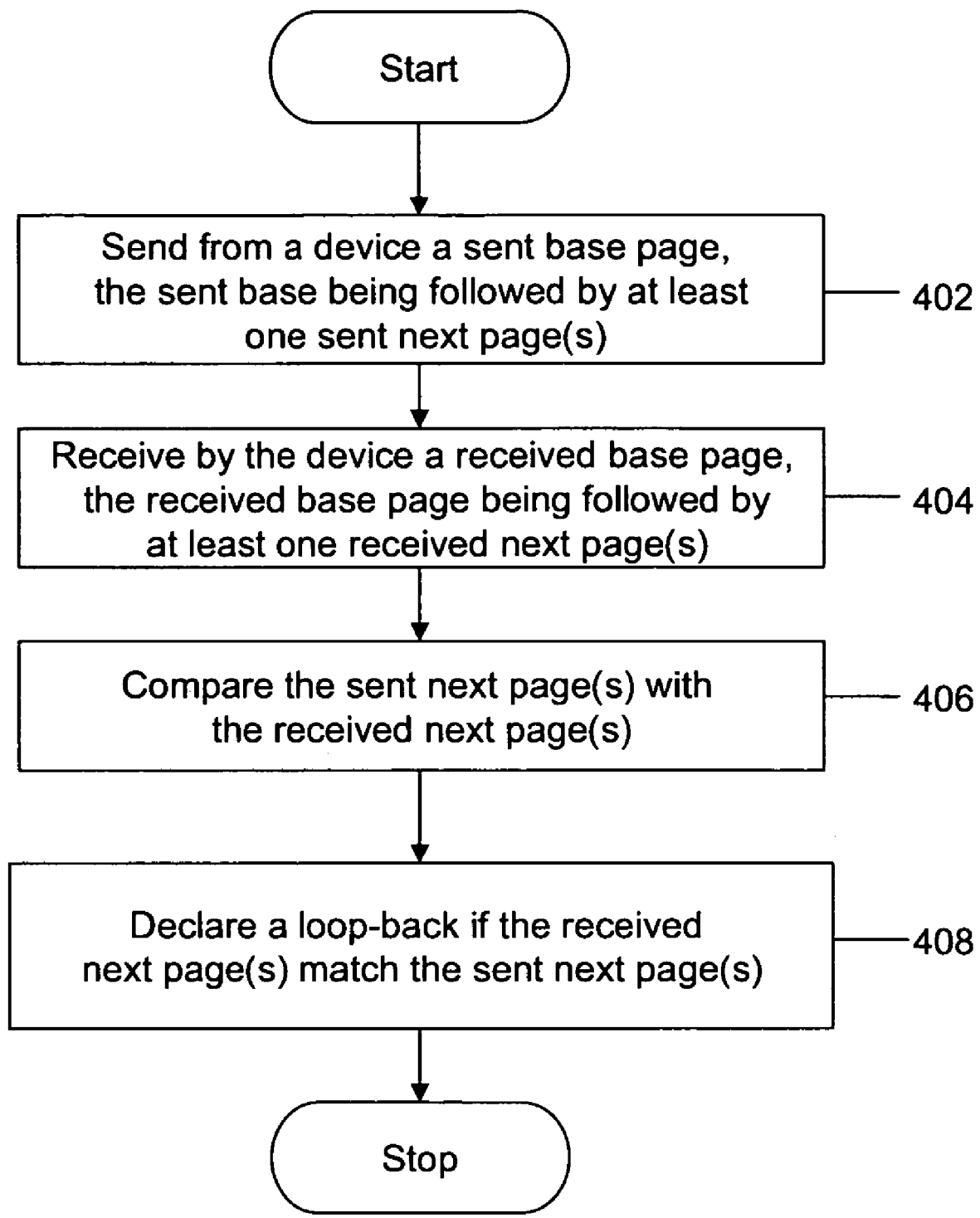
FIG. 4 is a flowchart depicting a method for detecting loop-back, in accordance with another exemplary embodiment of the present invention.

FIG. 4 is a flowchart depicting a method for detecting loop-back, in accordance with another exemplary embodiment of the present invention. At step 402, a sent base page is sent from a first device in the physical layer. The sent base page is followed by zero or more sent next pages. Subsequently, at step 404, a received base page is received at the first device. The received base page is followed by zero or more received next pages. In an embodiment of the invention, a second device sends the received next page. In an embodiment of the invention, if the second device does not send the received next page, then a no loop-back condition is declared. At step 406, the sent next page is compared to the received next page. In an embodiment of the invention, zero or more sent next pages and received next pages are compared. At step 408, loop-back is declared if the sent next page matches the received next page. In an embodiment of the invention, loop-back is declared if the zero or more sent next pages match the zero or more received next pages. This is explained in detail in conjunction with FIG. 5.

Figure 5A:
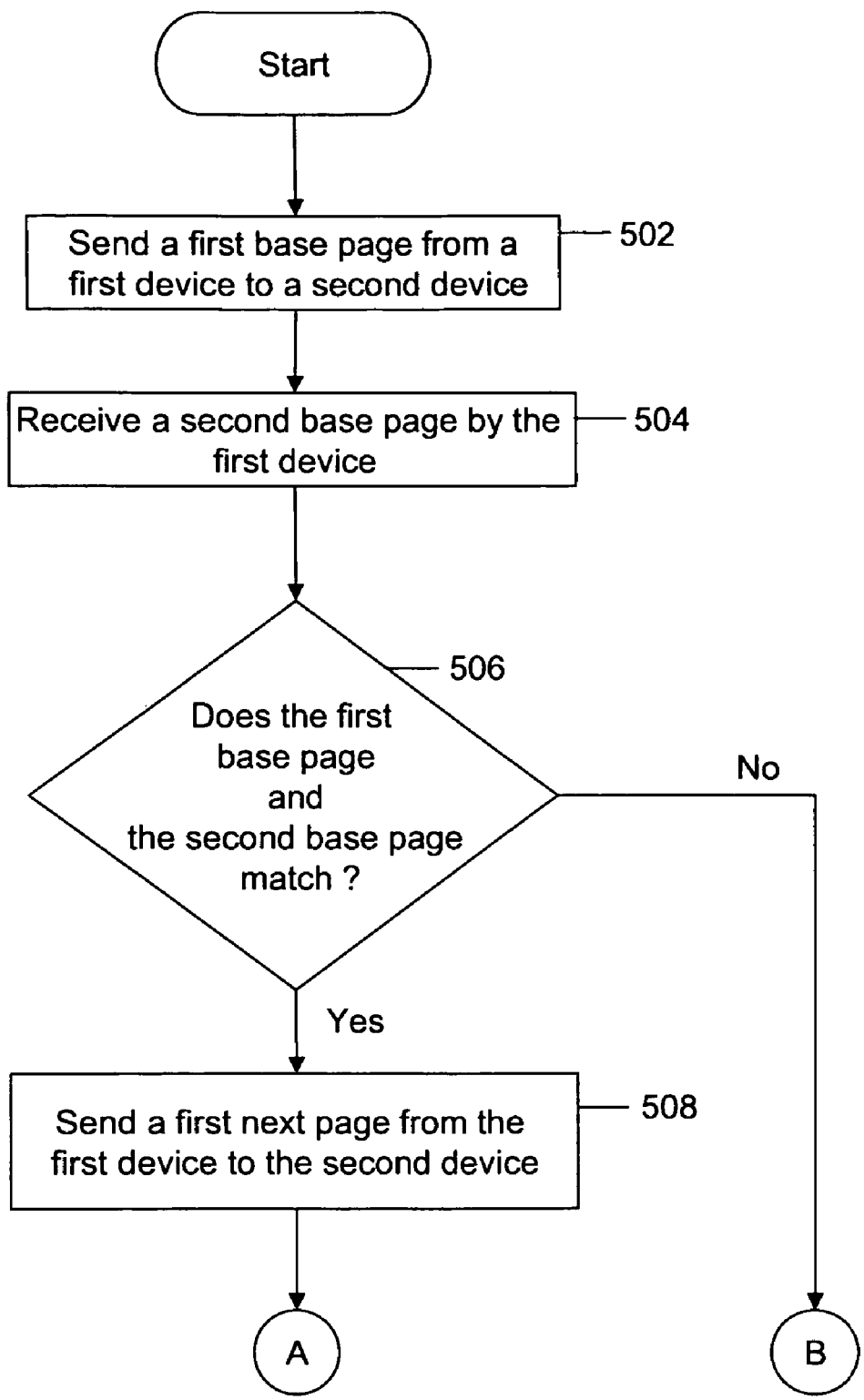
FIG. 5*a* is a first portion of a flowchart depicting a method for detecting loop-back, in accordance with yet another exemplary embodiment of the invention.
Figure 5B:
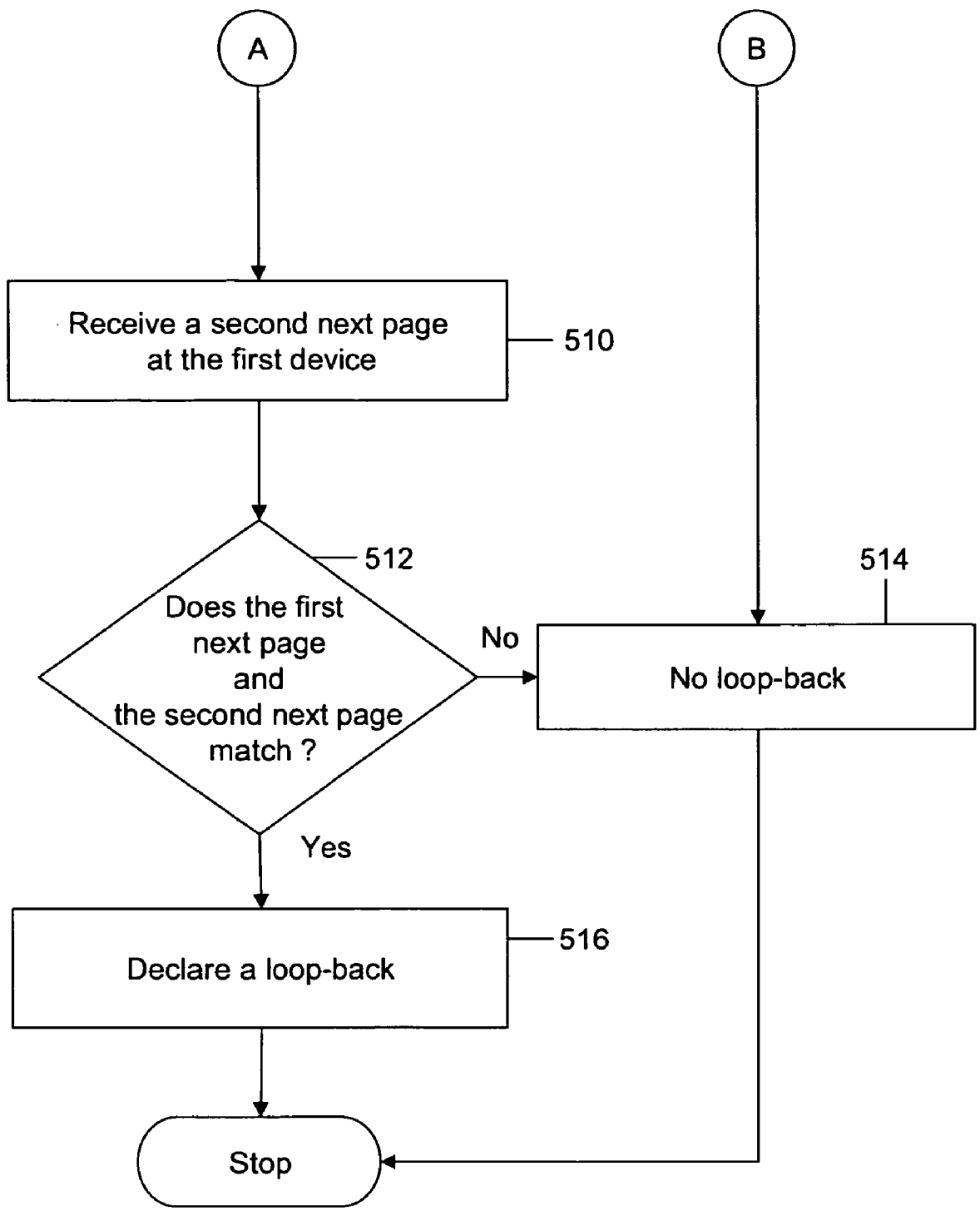
FIG. 5*b* is a second portion of a flowchart depicting a method for detecting loop-back, in accordance with yet another exemplary embodiment of the invention.

FIGS. 5a and 5b is a flowchart depicting a method for detecting loop-back, in accordance with yet another exemplary embodiment of the invention. At step 502, a first device sends a sent base page to a second device. At step 504, the first device receives a received base page. In an embodiment of the invention, the second device sends the received base page. In various embodiments of the invention, next page capability checker 202 is utilized to send the sent base page and to receive the received base page. In an embodiment of the invention, the ANER is checked for a 'page received' bit. The page received bit, if set to '1' in the ANER, indicates the receipt of the received base page. In an embodiment of the invention, the received base page is similar to the sent base page.

At step 506, the sent base page is compared to the received base page. In various embodiments of the invention, the comparison is achieved by utilizing next page capability checker 202. In an embodiment of the invention, the sent base page is compared to the received base page by checking a Next Page (NP) bit in the ANLPAR and the ANAR. In an embodiment of the invention, the NP bit is set to '1' in the ANAR. In an embodiment of the invention, if the NP bit is set to '0' in the ANLPAR, then there is no loop-back. In another embodiment of the invention, if the NP bit is set to '0' in the AINLPAR, then the second device is not capable of sending and receiving next pages. Subsequently, a no loop-back condition is declared at step 514. In various embodiments of the invention, the no loop-back condition is declared by utilizing next page capability checker 202.

In an embodiment of the invention, if the NP bit is also set to '1' in the ANLPAR, then the second device is capable of sending and receiving a next page. In another embodiment of the invention, if the NP bit is also set to '1' in the ANLPAR, then there may be a loop-back. In another embodiment of the invention, the sent base page is reverted to the first device as a received base page.

In an embodiment of the invention, if the information in ANAR matches the information in ANLPAR, then there may be a loop-back. In another embodiment of the invention, if the information in ANAR matches the information in ANLPAR, then the second device may be a valid PHY, which is capable of sending and receiving next pages.

Further, more information is required if the information in ANAR matches the information in ANLPAR. In an embodiment of the invention, more information is acquired by exchanging next pages between the first device and the second device. The information exchanged by next pages includes the formatting of the next page, a message code, etc. For example, the next page may be formatted as a message page or an unformatted page.

At step 508, the first device sends a sent next page to the second device. In various embodiments of the invention, the sent next page is sent by utilizing next page sender 204. In an embodiment of the invention, the sent next page is an unformatted page. An unformatted page is 11-bit long. In an embodiment of the invention, the sent next page contains the Media Access Control (MAC) address of the first device. The MAC address is the hard-coded address of the PHY of the first device, and is a globally unique address for each network interface controller. The MAC address is 48-bit long. In a preferred embodiment of the invention, the first device sends five sent next pages. The five sent next pages are required to specify the MAC address of the first device.

In an embodiment of the invention, the next pages are sent one after another. The information in each next page is updated in the AINTR. In an embodiment of the invention, the page received bit of the ANER is checked to verify the receipt of the received next page.

At step 510, a received next page is received at the first device. The received next page can be sent by the second device to the first device. In various embodiments of the invention, the received next page is received by utilizing next page receiver 206. In an embodiment of the invention, the received next page contains the MAC address of the second device. In an embodiment of the invention, five received next pages are received at the first device.

At step 512, the sent next page is compared to the received next page. In various embodiments of the invention, the comparison is achieved by utilizing next page comparer 208. In an embodiment of the invention, the information pertaining to the ANNPTR is compared to the information in the ANLPN-PRR. In another embodiment of the invention, the MAC address sent in the sent next page is compared to the MAC address received in the received next page. In yet another embodiment of the invention, an 'acknowledge' bit in the ANLPNPRR is checked. The acknowledge bit, if it is set to '1' in the ANLPNPRR, indicates that the sent next page has been received by a valid PHY.

At step 514, no loop-back condition is declared. In various embodiments of the invention, the no loop-back condition is declared by utilizing next page comparer 208. In an embodiment of the invention, no loop-back condition is declared if the acknowledge bit is set to '1' in the ANLPNPRR. In another embodiment of the invention, no loop-back condition is declared if the information in the ANNPTR does not match the information in ANLPNRR.

In an embodiment of the invention, if the sent next page and the received next page do not match, then a further next page is sent with the NP bit set to '0', to terminate the transmission.

In an embodiment of the invention, a series of next page transfers and comparisons are made to establish a loop-back or no loop-back condition.

At step 516, loop-back is declared if the information in ANNPTR matches the information in ANLPNPRR. In various embodiments of the invention, the loop-back is declared by utilizing next page comparer 208. In an embodiment of the invention, loop-back is declared if the acknowledge bit is set to '0' in the ANLPNPRR.

In an embodiment of the invention, if the first device is not capable of sending next pages and next page capability checker 202 detects that the second device is also not capable of sending next pages, a no loop-back condition is declared and the first device may use base pages to change the PHY link parameters.

In an embodiment of the invention, the PHY does not set the link up, in the event of a loop-back. The link up is required for data transmission from layer 2.

In an embodiment of the invention, for the first device that do not support an 'ack2' function, an 'ack2' bit is set to '0' in the next pages transmitted to the second device, as any other message codes are not supported by such devices.

Figure 6A:
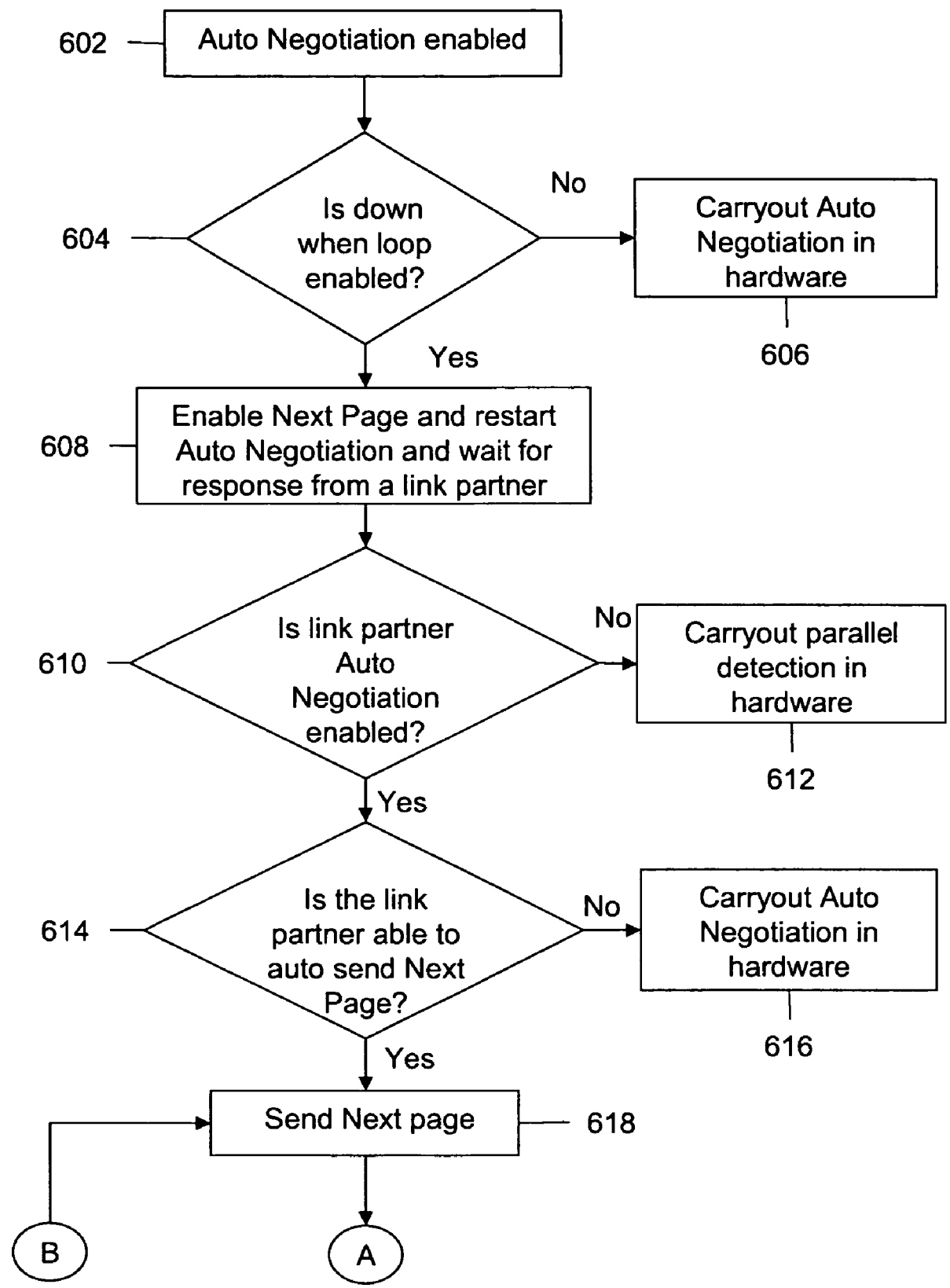
FIG. 6*a* is a first portion of a flowchart depicting a method for performing auto negotiation and detecting loop-back, in accordance with still another exemplary embodiment of the invention.
Figure 6B:
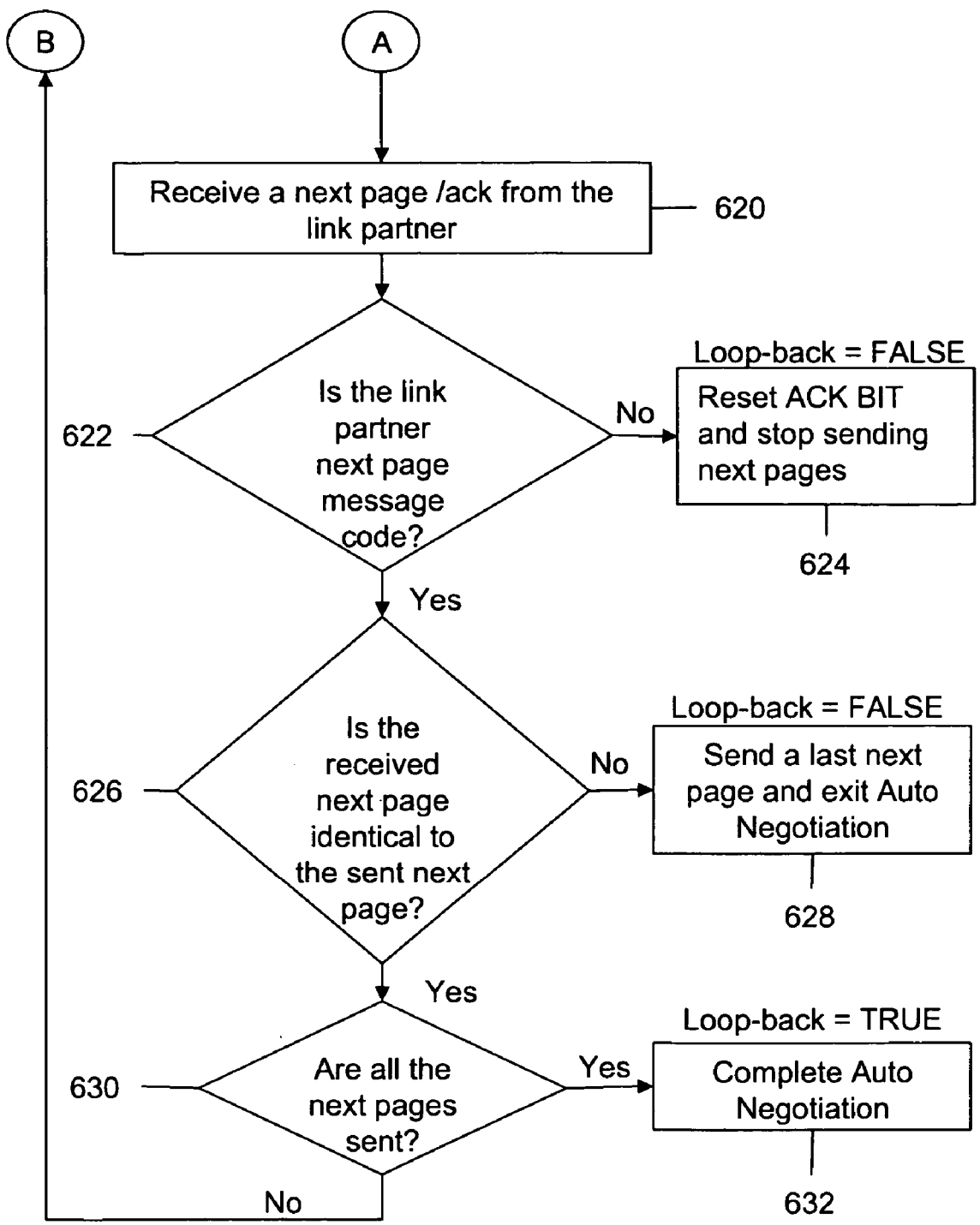
FIG. 6*b* is a second portion of a flowchart depicting a method for performing auto negotiation and detecting loop-back, in accordance with still another exemplary embodiment of the invention.

FIGS. 6a and 6b is a flowchart depicting a method for performing auto negotiation and detecting loop-back, in accordance with still another exemplary embodiment of the invention. At step 602, an auto negotiation feature of the physical layer of first device 104 is enabled. In an embodiment of the invention, the auto negotiation feature is required for automatic configuration of the physical layers. At step 604, a configuration option 'down-when-looped' of the physical layer is checked. Thereafter, at step 606, if the 'down-when-looped' configuration option is not enabled then the auto negotiation is carried out in the hardware. In an embodiment of the invention, if the 'down-when-looped' configuration option is not enabled then the method provided by the invention is not used for detecting the loop-back. At step 608, if the down when looped option is enabled, then first device 104 is enabled to send next pages. Subsequently, a sent base page is sent from first device 104. Thereafter, a received base page is received at first device 104. In an embodiment of the invention, the received base page is sent by second device 106. At step 610, the auto negotiation capability of second device 106 is checked. In an embodiment of the invention, the auto negotiation capability of second device 106 is checked by transmitting base pages. At step 612, if the auto negotiation feature of second device 106 is not enabled then a parallel detection is carried out in the hardware. At step 612, if the auto negotiation feature of the second device 106 is enabled, then auto negotiation is carried out, at step 614. At step 614, the capability of second device 106 to automatically send next pages is checked. In an embodiment of the invention, the capability of second device 106 to send next pages is checked by using next page capability checker 202. At step 616, if second device 106 is not able to automatically send next pages then auto negotiation is carried out in hardware. At step 618, a sent next page is sent from first device 104, if second device 106 is able to automatically send next pages. In an embodiment of the invention, next page sender 204 is used to send the sent next page. At step 620, a received next page is received at first device 104. In an embodiment of the invention, the received next page is sent by second device 106. In an embodiment of the invention, next page receiver 206 is used to receive the received next page. At step 622, if the received next page has a next page message code, then a no loop-back is declared. Thereafter, the ack bit in ANLPNPRR is set to '0' and transmission of next pages is stopped, at step 624. At step 622, if the received next page does not have a next page message code, then the sent next page and the received next page are compared, at step 626. In an embodiment of the invention, the sent next page and the received next page are compared by next page comparer 208. At step 626, if the sent next page is not identical to the received next pages then a no loop-back is declared. At step 628, a no loop-back is declared and a last sent next page is sent and auto negotiation is stopped. At step 630, if the sent next page and the received next page are identical, then more sent next pages are sent. At step 630, if all the sent next pages and the received next pages are identical then a loop-back is declared and auto-negotiation is completed.

A DTE power detect mechanism in a PHY may use a principle that is analogous to the methods provided by the embodiments of the invention. The DTE detect mechanism provided in a patent publication US20040186689, assigned to Cisco Technology Inc. is incorporated as a reference herein. However, both cannot be supported simultaneously. Moreover, a PHY such as Intel™ LXT9785 does not allow next page capability if the DTE power detect mechanism is enabled. In an embodiment of the invention, the DTE power detect mechanism may use the methods provided by the various embodiments of the invention, if the port is connected to a powered device or a PHY. In another embodiment of the invention, the DTE power detect may be made mutually exclusive to a 'down-when-looped' feature. In an embodiment of the invention, the 'down-when-looped' feature indicates that the link is down when loop-back is detected. In an embodiment of the invention, the 'down-when-looped' feature is turned off by default.

In an embodiment of the invention, if the platforms use the next page with the standard message code, then the methods provided by the various embodiments of the invention may be added to the messages that are exchanged.

Embodiments of the present invention provide a method and a system to detect a PHY loop-back. The loop-back is detected before linking up the layer 2, which prevents data loss. The embodiments of the invention also result in a reduction in the consumption of resources of the CPU of a device. The consumption of resources is reduced, as the CPU is not required to constantly send and receive frames to detect loop-back.

Although the invention has been discussed with respect to specific embodiments thereof, these embodiments are merely illustrative, and not restrictive, of the invention. For example, a 'method for detecting a PHY loop-back ' can include any type of analysis, manual or automatic, to anticipate the needs of detecting a loop-back.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for detecting loop-back in a physical layer on an Ethernet link comprising:
    sending in a physical layer, by a device on an Ethernet link, a base page with a Next Page capability bit, wherein the Next Page capability bit is a bit that if set, indicates that a loop-back in the physical layer exists;
    receiving in the physical layer, by the device on the Ethernet link, a received base page; and
    determining that the Next Page capability bit is set in the received base page for detecting a loop-back in the physical layer.

2. A method for detecting a loop-back in a physical layer on an Ethernet link comprising:
    sending in a physical layer, by a device on an Ethernet link, a base page with a Next Page capability bit, wherein the next page capability bit is a bit that if set, indicates that a loop-back in the physical layer exists;
    receiving in the physical layer, by the device on the Ethernet link, a received base page; and
    examining the Next Page capability bit in the received base page for detecting a loop-back in the physical layer.

3. The method of claim 2, wherein said examining the Next Page capability bit in the received base page comprises conducting a decision step selected from the group of decision steps consisting of:
    deciding to continue with the loop-back detection if the Next Page capability bit is set in the received base page; and
    deciding that the loop-back does not exist if the Next Page capability bit is not set in the received base page.

4. The method of claim 3, wherein said deciding to continue with the loop-back detection comprises deciding to commence sending a next page, if the Next Page capability bit is set in the received base page.

5. A method for detecting loop-back in a physical layer on an Ethernet link, the method comprising:
- sending from a device a sent base page in the physical layer, the sent base page being followed by zero or more sent next pages;
- receiving by the device a received base page in the physical layer, the received base page being followed by zero or more received next pages;
- comparing the sent next pages with the received next pages, wherein the comparing the received next pages and the sent next pages comprises:
  - comparing information contained in an Auto-Negotiation Next Page Transmit Register (ANNPTR) and the information contained in an Auto-Negotiation Link Partner Next Page Receive Register (ANLPNPRR), if the next-page received bit is set in an Auto-Negotiation Expansion Register (ANER); and
  - reading an acknowledge bit in the ANLPNPRR; and
- declaring a loop-back if the received next pages match the sent next pages.

6. The method of claim 5, wherein the zero or more sent next pages comprises five sent next pages and the zero or more received next pages comprises five received next pages.

7. The method of claim 6, the method further comprises:
- comparing respectively the five sent next pages with the five received next pages; and
- declaring a loop-back if the five sent next pages respectively match the five received next pages.

8. The method of claim 5, wherein the sending the zero or more sent next pages comprises:
- checking a Next Page (NP) bit in an Auto Negotiation Link Partner Advertisement Register (ANLPAR); and
- sending the sent next pages, if the NP bit is set in the ANLPAR.

9. The method of claim 8, wherein the sending the sent next pages comprises encoding the Media Access Control (MAC) address of the device in the sent next pages.

10. The method of claim 5, wherein the receiving the zero or more received next pages comprises:
- checking an Auto Negotiation Expansion Register (ANER) for a next-page received bit; and
- reading an Auto-Negotiation Link Partner Next Page Receive Register (ANLPNPRR), if the next-page received bit is set in the ANER.

11. A system for detecting loop-back in a physical layer on an Ethernet link, the system comprising:
- a next page sender for sending a sent base page followed by_zero or more sent next pages;
- a next page receiver for receiving a received base page followed by_zero or more received next pages; and
- a next page comparer for comparing the sent next pages and the received next pages, wherein the comparing the received next pages and the sent next pages comprises:
  - comparing information contained in an Auto-Negotiation Next Page Transmit Register (ANNPTR) and the information contained in an Auto-Negotiation Link Partner Next Page Receive Register (ANLPNPRR), if the next-page received bit is set in an Auto-Negotiation Expansion Register (ANER); and
  - reading an acknowledge bit in the ANLPNPRR, wherein a loop-back is declared if the received next pages match the sent next pages.

12. The system of claim 11, wherein the system further comprises a next page capability checker for checking the capability to send next pages.

13. An apparatus for detecting loop-back in a physical layer on an Ethernet link, the apparatus comprising:
- means for sending from a device a sent base page in the physical layer, the sent base page being followed by zero or more sent next pages;
- means for receiving by the device a received base page in the physical layer, the received base page being followed by zero or more received next pages;
- means for comparing in the physical layer the sent next pages with the received next pages, wherein the comparing the received next pages and the sent next pages comprises:
  - means for comparing information contained in an Auto-Negotiation Next Page Transmit Register (ANNPTR) and the information contained in an Auto-Negotiation Link Partner Next Page Receive Register (ANLPNPRR), if the next-page received bit is set in an Auto-Negotiation Expansion Register (ANER); and
  - means for reading an acknowledge bit in the ANLPNPRR; and
- means for declaring a loop-back if the received next pages match the sent next pages.

14. A machine-readable medium for detecting loop-back in a physical layer on an Ethernet link, the instructions executable by the machine-readable medium comprising:
- one or more instructions for sending from a device a sent base page in a physical layer, the sent base being followed by zero or more sent next pages;
- one or more instructions for receiving by the device a received base page in the physical layer, the received base page being followed by zero or more received next pages;
- one or more instructions for comparing in the physical layer the sent next pages with the received next pages, wherein the one or more instructions for comparing the received next pages and the sent next pages comprises:
  - one or more instructions for comparing information contained in an Auto-Negotiation Next Page Transmit Register (ANNPTR) and the information contained in an Auto-Negotiation Link Partner Next Page Receive Register (ANLPNPRR), if the next-page received bit is set an Auto-Negotiation Expansion Register (ANER); and
  - one or more instructions for reading an acknowledge bit in the ANLPNPRR; and
- one or more instructions for declaring a loop-back if the received next pages match the sent next pages.

* * * * *